Figure 11:
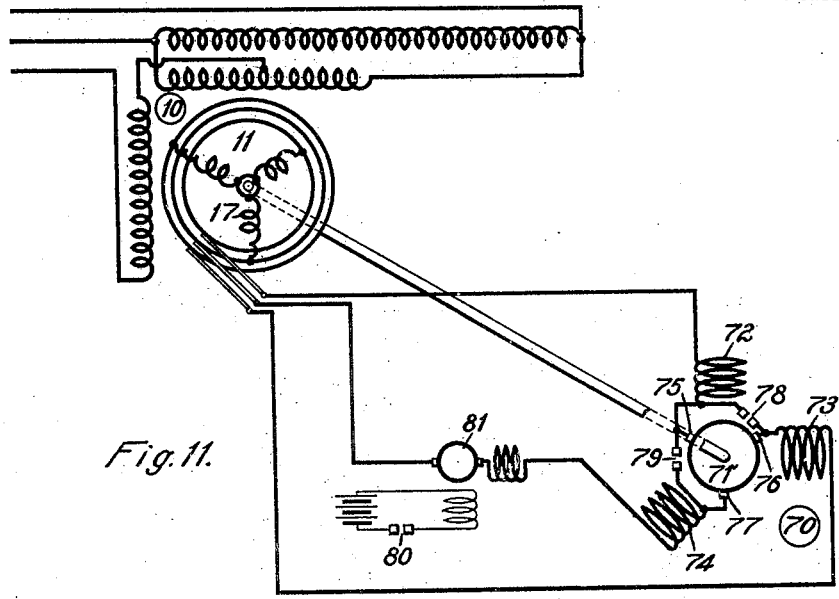

R. E. HELLMUND.
METHOD OF AND APPARATUS FOR OPERATING INDUCTION MACHINES.
APPLICATION FILED OCT. 24, 1916. RENEWED OCT. 12, 1920.
1,376,434.
Patented May 3, 1921.
4 SHEETS—SHEET 1.
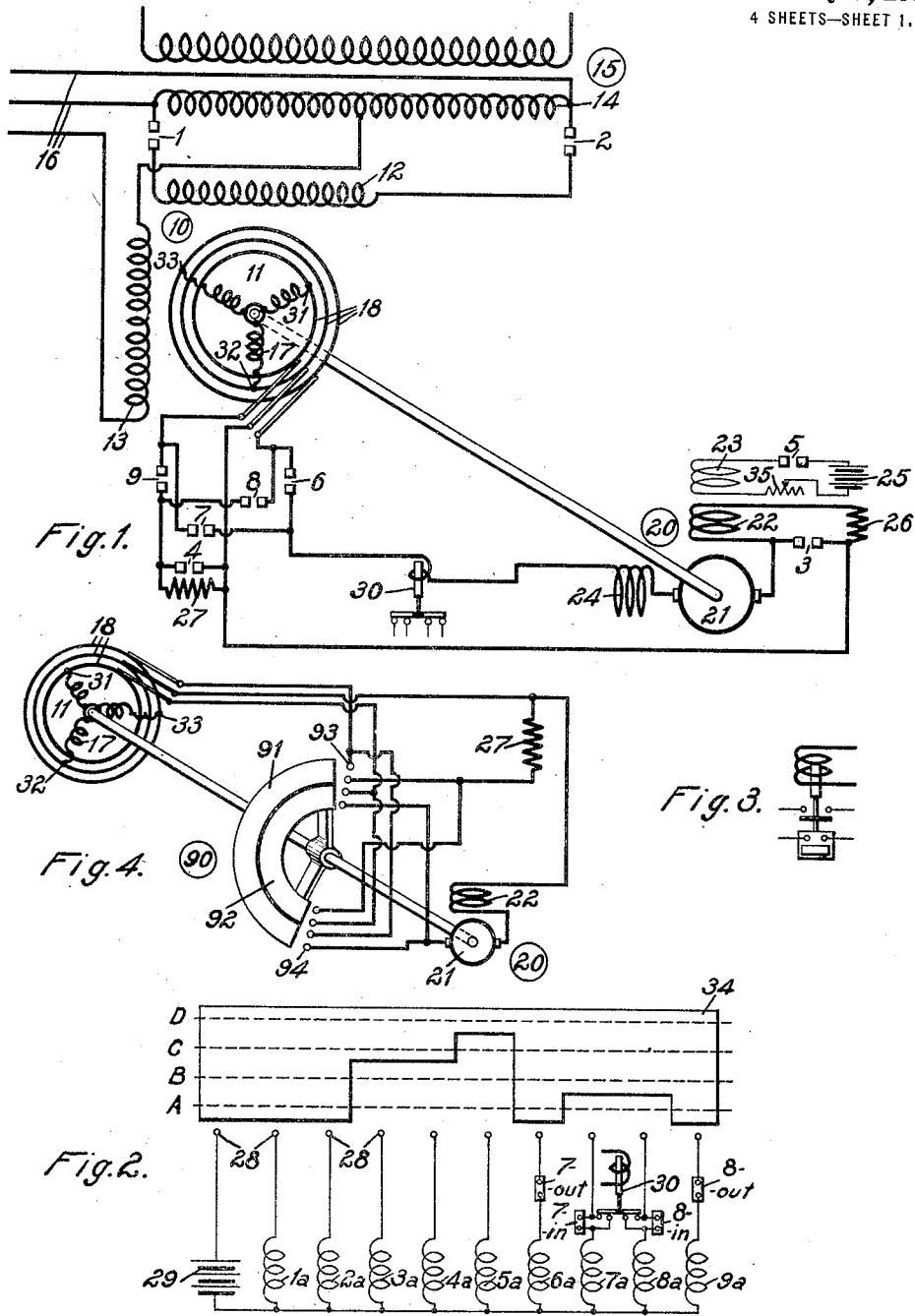

R. E. HELLMUND.
METHOD OF AND APPARATUS FOR OPERATING INDUCTION MACHINES.
APPLICATION FILED OCT. 24, 1916. RENEWED OCT. 12, 1920.
1,376,434.
Patented May 3, 1921.
4 SHEETS—SHEET 2.
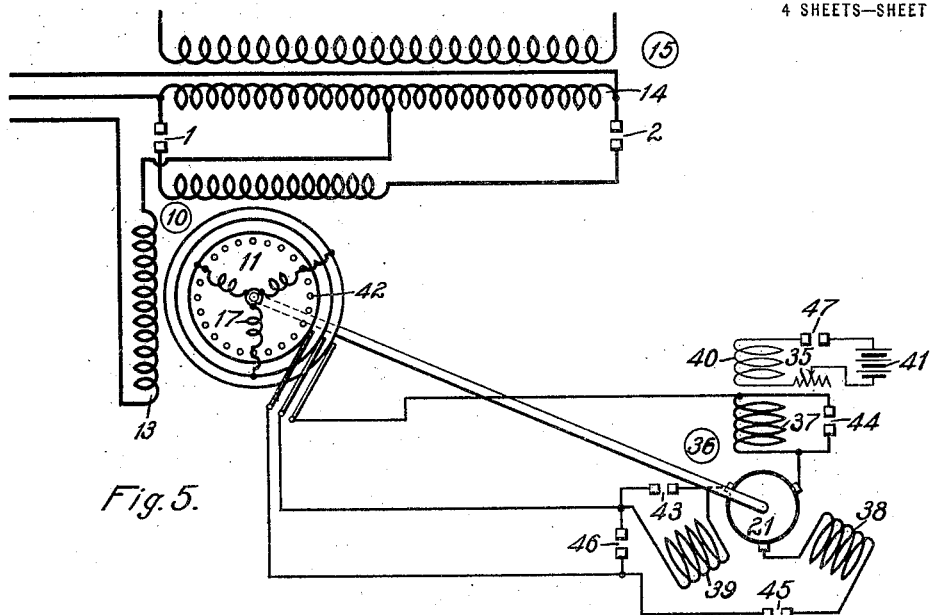
Fig. 5.
Fig. 6.
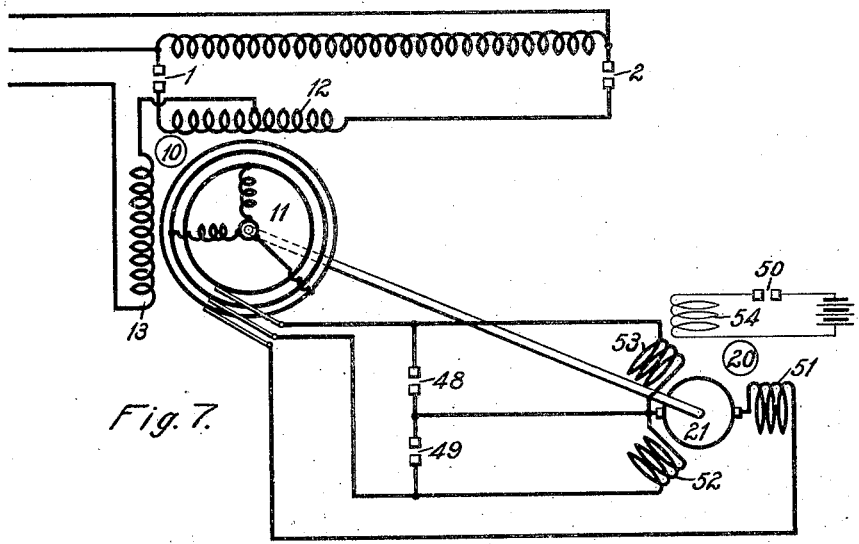
Fig. 7.
Fig. 8.
WITNESSES:
O. J. Fitzgerald
D. C. Davis
INVENTOR
Rudolf E. Hellmund.
BY
Wesley L. Carr
ATTORNEY

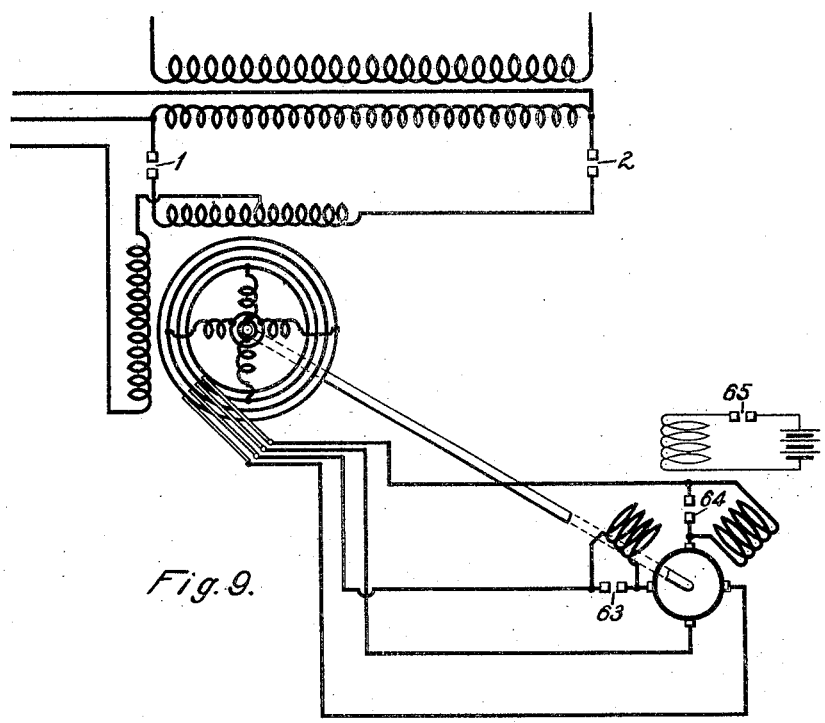

WITNESSES:

INVENTOR
Rudolf E. Hellmund.
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

METHOD OF AND APPARATUS FOR OPERATING INDUCTION-MACHINES.

1,376,434.  Specification of Letters Patent.  Patented May 3, 1921.

Application filed October 24, 1916, Serial No. 127,380. Renewed October 12, 1920. Serial No. 416,510.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Methods of and Apparatus for Operating Induction - Machines, of which the following is a specification.

My invention relates to a method of, and apparatus for, starting and regulating induction machines, and it has for its object to provide apparatus of the character designated wherewith induction machines of the non-self-starting type may be simply, conveniently and effectively started and brought up to any desired speed and whereby the starting means may then be employed for the regulation of the induction machine in improving the power-factor and speed regulation thereof.

In the accompanying drawing, Figure 1 is a diagrammatic view of a phase-converter of the well-known, single-phase, induction type, together with suitable supply and control circuits and attendant apparatus embodying a preferred form of my invention; Fig. 2 is a control diagram illustrating apparatus suitable for the control and operation of the switches of the system of Fig. 1 in a preferred sequence; Fig. 3 is a diagrammatic view of an electromagnetic switch provided with a control board and suitable for use in the system of Fig. 1; Figs. 4, 5, 7, 9, 11 and 12 are diagrammatic views of modifications of the system shown in Fig. 1; and Figs. 6, 8, and 10 are sequence charts illustrating a preferred order of switch operation in the systems of Figs. 5, 7 and 9, respectively.

In my copending applications, Serial Nos. 113,454 and 113,456, filed Aug. 7, 1916, I describe and claim means whereby an auxiliary commutator machine is conductively associated with the primary winding of a phase-converter of the rotary induction type during the starting operation and wherein said auxiliary machine is then transferred to the secondary circuit of the phase-converter for power - factor regulation and for similar exciting purposes.

The present system is in general similar to those shown in the aforementioned applications but the commutator machine is, at all times, connected to the secondary or rotor circuit of the phase converter and, in this manner, more or less troublesome switching operations are avoided. At standstill, the phase-converter operates merely as a transformer in supplying energy to the auxiliary machine for starting purposes, said energy obviously being supplied at full line frequency. As the phase-converter comes up to normal speed, the frequency of the current supplied to the auxiliary machine decreases until it attains the normal slip frequency of the phase-converter. By then supplying a direct-current excitation to the auxiliary machine, direct-current excitation may be supplied to the phase-converter for synchronous operation and phase compensation, as is well understood.

For a more detailed understanding of my invention, attention is first directed to Fig. 1 in which a phase-converter of the single-phase induction type is shown at 10, said machine comprising a phase-wound rotor 11, a primary stator winding 12 and a tertiary stator winding 13. Energy for the operation of the rotor is derived from any suitable source, such, for example, as the secondary winding 14 of a transformer 15, and energy derived directly from the secondary winding 14 is combined with that derived from the tertiary winding 13 for the energization of a polyphase system 16, as is well understood in the art.

The rotor 11 of the phase-converter 10 is provided with a phase-winding 17 terminating in suitable slip rings 18 upon which bear brushes communicating through suitable switches with an auxiliary commutating machine 20 mechanically coupled to the phase-converter 10, as, for example, by having its rotor member mounted on the same shaft therewith. The auxiliary machine 20 comprises a rotor member 21, a main exciting field winding 22, an auxiliary exciting field winding 23 and a cross or compensating field winding 24.

Connection between the primary winding 12 of the phase-converter and the source 13 is controlled by suitable switches 1 and 2. Two phases of the rotor winding 17 may be connected in series with the armature, main exciting and compensating field windings of the auxiliary machine 20 by the closure of suitable switches 6 and 9. The phases of the rotor winding supplying energy to the machine 20 may be changed by opening the switches 6 and 9 and closing suitable switches 7 and 8 for a purpose to be hereinafter more fully described. Direct-current excitation may be supplied for the auxiliary exciting field winding 23 of the machine 20 from a suitable source 25 by the closure of a switch 5. The main exciting field winding 22 of the machine 20, together with a regulating resistor 26, may be eliminated from the circuit by the closure of a switch 3. An additional regulating resistor 27 may be eliminated from the supply circuit of the machine 20 by the closure of a suitable short-circuiting switch 4.

The switches 1 to 9, inclusive, may take any one of a variety of forms, the specific type employed constituting no part of the present invention. A suitable form is indicated in Fig. 3, being the well-known electro-magnetic switch provided with main contact members and with auxiliary contact members coacting with a control board for the energization of interlocking circuits, as is well known in the art.

In the control diagram of Fig. 2, a main control segment 34 is adapted to coact with a plurality of contact fingers 28—28 in four distinct positions A, B, C and D and, in so doing, to supply energy to the operating coils 1ª to 9ª, inclusive, of the switches 1 to 9 from a control battery 29, in accordance with a predetermined sequence. A relay 30 has its operating coil inserted in a lead to the driving motor 20 and controls the supply of energy to the operating coils of the switches 7 and 8, as will be hereinafter more fully pointed out.

Having thus described the arrangement of a system embodying my invention, the operation is as follows: The contact segment 34 is first moved to position A and the switches 1, 2, 6 and 9 are closed. The primary stator winding of the phase-converter 10 is connected to the source 14 and, the rotor of said machine being at standstill, the winding acts as the secondary winding of an ordinary transformer and supplies energy to the auxiliary machine 20 through the switch 6, the resistor 26 being included in circuit in order to prevent a rush of current under the influence of the relatively high voltage developed at standstill. A resistor 27 is connected between the points 31 and 32 of the rotor winding 17 through the switch 9 and permits the circulation of secondary currents through a portion of the rotor winding, permitting the building up of torque within the rotor member 11. The passage of current to the driving motor 20 draws up the core of the relay 30 and prevents the closure of the switches 7 and 8 when the control segment 34 is moved to the position B.

Usually, the rotor will be in such a position that a secondary voltage will be induced between the points 32 and 33 of the rotor winding, sufficing to start the machine 20. If, however, the rotor is at standstill, in such position that insufficient electromotive force is produced between the points 32 and 33 to start the machine, the relay device 30 is unaffected, and the movement of the control segment 34 to the position B closes the switches 7 and 8, connecting the driving motor 20 to energized phases in the rotor winding 17. Obviously, the passage of current to said driving motor instantly opens the contact members of the relay device 30 but, by shunting said contact members with interlocks 7-in and 8-in, as shown, energy continues to be supplied to the motor 20. Suitable interlocks 7-out and 8-out are placed in series with the operating coils of the switches 6 and 9, respectively, so that said switches are not closed simultaneously with the switches 7 and 8.

The control segment 34 is maintained in the position B until the machine 10 has been brought up to speed, whereupon said control segment is moved to the position C, closing the switches 3 and 4, thus eliminating the resistors 26 and 27 and the main exciting field winding 22 of the machine 20 from the circuit. There are thus produced two V-connected short-circuiting paths of low resistance for the rotor winding 17 of the phase-converter 10, one of said paths traversing the switch 4 and the other traversing the compensating field winding 24 and the armature 21 of the auxiliary machine 20 and the switch 3. The machine 20 obviously performs no function during this phase of the starting operation, which may be considered as a transition period. The control segment 34 is finally moved to the position D, closing the switch 5 and establishing direct-current excitation for the machine 20, which, thereupon supplies direct-exciting current to a portion of the rotor winding 17, immediately increasing the rotor speed and causing the phase-converter to operate synchronously. By thereafter adjusting the amount of direct-current excitation by any suitable means, such, for example, as a resistor 35, the power-factor of the phase converter 10 may be adjusted, as is well known.

While I have thus shown the auxiliary machine 20 employed normally as a source of direct-current excitating current for power-factor compensation, it is obvious that it may also be employed as a source of double-frequency current for boosting or otherwise, as indicated in my aforementioned applications, said other uses of the auxiliary machine constituting no part of the present invention, the gist of which resides in the cascade operation of the two machines during both the starting and the operating connections.

As an alternative to the structure shown in Figs. 1, 2 and 3 for insuring the derivation of starting current for the driving motor 20 from the rotor 11, irrespective of the rest position of said rotor member, I may employ the structure shown in Fig. 4, wherein the position of rest of the rotor member itself determines what phase winding thereof is connected to the motor 20. The phase-converter and starting motor are arranged as in the system of Fig. 1, and a contact segment 90, comprising two conducting, arc-shaped portions 91 and 92, is mounted on the shaft of the phase-converter and arranged to make non-simultaneous contact with two sets of contact members or studs 93 and 94. Suitable connections are provided so that, if the rotor member comes to rest with the member 90 in contact with the studs 93, the motor 20 is connected between the points 31 and 32 of the rotor winding, and the resistor 27 is connected between the points 32 and 33, whereas, if the member 90 rests in contact with the studs 94, the motor 20 is connected between the points 32 and 33. Thus, the motor 20 may be arranged to receive starting current at any position of the rotor when at rest.

While I have thus shown two methods of insuring the supply of initial starting current to the driving motor under all conditions, it is obvious that various other arrangements might be devised to achieve the same result. If desired, the motor 20 might be connected to receive energy from one rotor phase and, in the event of insufficient energy being developed in said phase because of the angular position thereof, manual means might be provided to connect the motor 20 to another phase, although, obviously, automatic means such as those I have illustrated are, in general, to be preferred to manual means.

I may associate a phase-converter with a polyphase commutator starting motor, as shown in Fig. 5, and, by this means, obtain a simple and effective start with all positions of rest of the phase-converter rotor. A phase-converter 10, similar to that shown in Fig. 1, is mechanically coupled to an auxiliary polyphase commutator machine 36 comprising an armature 21 and combined inducing and exciting field windings 37, 38 and 39 together with an auxiliary field winding 40 adapted to be energized from a direct-current source 41 through an adjustable resistor 35 for synchronous operation of the phase-converter. The rotor 11 of the phase-converter 10 may be provided with a squirrel-cage winding 42, in addition to the phase winding, to aid in the operation as a phase-converter and also to supply a starting torque as soon as rotation has commenced.

The phase-converter 10 may be connected to the supply 14 through switches 1 and 2, as before, and the field windings 37 and 39 of the machine 36 may be short-circuited by suitable switches 44 and 43, respectively. The field winding 38 may be eliminated by opening a switch 45. The closure of a switch 46 closes a circuit across two of the phase windings of the rotor 11.

The various switches are operated in the sequence indicated in Fig. 6 by any desired means, such, for example, as a control system similar to that indicated in Fig. 1. At the outset, the switches 1, 2 and 45 are closed, energizing the primary winding of the phase-converter and permitting current to flow instantaneously from the secondary or rotor winding thereof through the switch 45 and the field winding 38 to the rotor 21 of the machine 36, whence it divides, a portion passing through each of the other field windings and returning thence to the rotor winding 17. The motor 36 thereupon starts and brings the phase-converter 10 up to the desired speed, starting torque also being provided by the squirrel-cage winding 42. The switches 43 and 44 are next closed deenergizing the field windings 39 and 37 of the machine 36 by short circuiting. The field winding 38 is then deënergized by opening the switch 45, and the switch 46 is simultaneously closed, whereupon currents from the rotor winding 17 of the phase-converter are free to circulate through a low-resistance path traversing the switch 46 or through a low-resistance path traversing the switches 43 and 44 and the armature of the machine 36. Finally, the switch 47 is closed, providing direct-current excitation, as in the previously described system.

Fig. 7 shows a system similar to those just described and suitable for application to a two-phase rotor winding and, when taken in connection with the sequence chart of Fig. 8, is self-explanatory. The essence of the operation is that, after the primary winding of the phase-converter is energized, current flows through all the field windings of the auxiliary machine, and the field windings 52 and 53 are then short circuited by the closure of suitable switches 48 and 49, preparatory to the superposition of direct-current excitation from the field winding 54 by the closure of a suitable switch 50. Attention is directed to the possibility of retaining the field winding 51 in circuit, throughout the entire operation, as a commutating winding.

Fig. 9 shows an alternative system for a quarter-phase wound rotor phase-converter, the said phases being independent and being connected to four brushes in the auxiliary starting motor. The operation will be self-evident from Fig. 8, when taken in connection with Fig. 10 and the foregoing description.

In the system of Fig. 11, a phase-converter 10, of the same form as shown in Fig. 1, is associated with an auxiliary machine 70 of the polyphase commutator type comprising an armature 71 and field windings 72, 73 and 74. The armature 71 is provided with a commutator cylinder upon which bear brushes 75, 76 and 77 having a 120° space relation with respect to each other. The axis of the field winding 72 lies substantially midway between the brushes 75 and 76, and the axis of the winding 74 lies substantially midway between the brushes 75 and 77 but the axis of the field winding 73 is in substantially space quadrature with the axis of the field winding 72.

At the outset, suitable switches 78 and 79 are closed so that the three brush sets 75, 76 and 77 are connected together through a low-resistance path. The outer terminals of the field windings 72, 73 and 74 are connected, respectively, to the terminals of the rotor winding 17 of the machine 10 and, therefore, the auxiliary machine 70 starts as a repulsion motor. At the very outset, the operation of the motor 70 is purely that of a single-phase machine but, as soon as the rotor 11 of the phase-converter begins to rotate, polyphase currents are supplied to the machine 70 for subsequent operation as a polyphase commutator machine. For the direct-current energization of the rotor winding 17, I may insert a distinct direct-current exciting machine 81 in one of the rotor leads.

Figure 12:
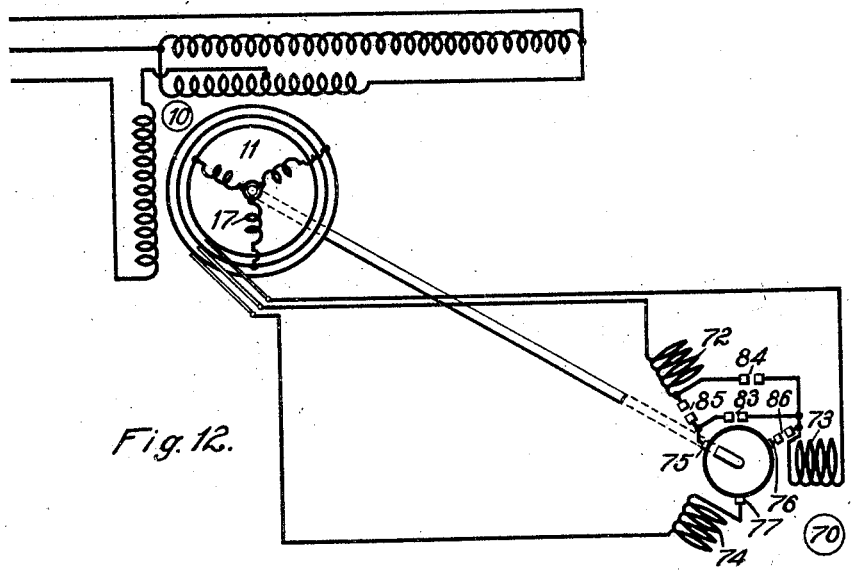

The system of Fig. 12 is, in many respects, similar to that of Fig. 11 except that the field windings 72, 73 and 74 are equally spaced from each other and each is mounted to operate partially as an exciting and partially as an inducing field winding. The brushes 75 and 76 may be connected directly together through suitable switches 83 and 86, and the inner terminal of the winding 72 may be connected to the brush 75 by a suitable switch 85 and to the brush 76 by a suitable switch 84. The switch 86 serves to disconnect the brush 76 from the circuit. At the outset, the switches 85 and 86 are closed, so that the auxiliary machine 70 starts as a series-connected polyphase commutator machine, each field winding being connected to its immediately adjacent brush. After the phase-converter has been brought up to speed, the switches 85 and 86 are open and the switches 83 and 84 are closed, resulting in a reversal of the direction of phase rotation of the stator flux of the machine 70 and, therefore, closing the same to operate as a generator and, by superposing suitable direct-current excitation thereupon, the corresponding effect or effects may be produced in the phase-converter.

Instead of altering the connections of the field windings in the machine of Fig. 12, it is obvious that an equivalent result might be obtained by shifting the brushes thereof.

While, throughout this application, I have shown my system as applied to phase-converters, it is obviously equally capable of application to all types of single-phase induction machines which require auxiliary starting apparatus and subsequent regulating apparatus.

Attention is again directed to the fact that a starting motor employed in connection with the herein described invention is supplied with current of line frequency only at the instant of starting, the frequency of the current supply thereto falling off very rapidly as the main machine comes up to speed. Thus, the severe sparking conditions attendant upon high frequency are encountered only for a very small portion of the time.

While I have shown my invention in a plurality of forms, it will be obvious to those skilled in the art that it is susceptible of various minor changes and modifications without departing from the spirit thereof and I desire, therefore, that only such limitations shall be placed thereupon as are imposed by the prior art or as are set forth in the appended claims.

I claim as my invention:

1. The combination with a source of single-phase alternating current, of a dynamo-electric machine of the single-phase induction type having its primary winding connected thereto, a starting motor of the commutator type for said machine mechanically coupled thereto and connected to derive its operating energy from the secondary winding thereof, and means for employing said starting motor as a regulating machine in the normal operation of said induction machine.

2. The combination with a source of single-phase alternating current, of a dynamo-electric machine of the single-phase induction type having its primary winding connected thereto, an auxiliary dynamo-electric machine of the commutator type mechanically coupled to said induction machine, and means for connecting said auxiliary machine to the secondary member of said induction machine for operation as a starting motor.

3. The combination with a source of single-phase alternating current, of a dynamo-electric machine of the single-phase induction type having its primary winding connected thereto, an auxiliary dynamo-electric machine of the commutator type mechanically coupled to said induction machine, means for connecting said auxiliary machine to the secondary member of said induction machine for alternative operation as a starting motor, or as a regulating generator, and means for producing a unidirectional field in said auxiliary machine during generating operation, whereby a component of direct current is supplied thereby to said induction machine for synchronous operation.

4. The combination with a source of single-phase alternating current, of a dynamo-electric machine of the single-phase induction type having its primary winding connected thereto, an auxiliary dynamo-electric machine of the commutator type mechanically coupled to said induction machine, and means for connecting said auxiliary machine to the secondary member of said induction machine for alternative operation as a starting motor or as a regulating generator.

5. The combination with a dynamo-electric machine of the induction type, of an auxiliary dynamo-electric machine of the commutator type at all times electrically associated with the secondary member thereof, means for employing said auxiliary dynamo-electric machine initially as a starting motor and subsequently as a regulating machine, and means for energizing said auxiliary dynamo-electric machine through said induction machine during the starting operation.

6. The combination with a phase-converter of the induction type, of an auxiliary dynamo-electric machine mechanically coupled thereto, connections from said auxiliary machine to the secondary member of said phase converter, whereby said auxiliary machine may, at times, be used as a starting motor, a source of direct current and means for, at other times, so modifying said connections that said auxiliary machine is energized from said direct-current source and caused to operate as a regulating machine.

7. The combination with a transformer comprising a single-phase primary winding and a plurality of movably mounted secondary windings arranged to be successively inductively interlinked with said primary winding, of a single-phase motor connected to normally derive electrical energy from a portion of said secondary windings and to move all of said secondary windings, and means for automatically transferring the connections of said motor to other of said secondary windings if the apparatus is at rest in such a position that the normal motor-energizing secondary windings are not inductively interlinked with said primary winding.

8. The method of operating a phase-converter of the rotary induction type having its secondary member mechanically and electrically connected to an auxiliary dynamo-electric machine which comprises initially operating said auxiliary machine as a starting motor through said phase-converter and the intervening connection and subsequently operating said auxiliary machine as a regulating dynamo-electric machine.

In testimony whereof, I have hereunto subscribed my name this 19th day of Oct., 1916.

RUDOLF E. HELLMUND.